May 9, 1961 — J. V. SCHAFER — 2,983,006

COLLAR CONNECTION

Filed June 14, 1957 — 3 Sheets-Sheet 1

INVENTOR.
JOHN V. SCHAFER
BY
Charles S. Penfold
ATTORNEY

May 9, 1961 J. V. SCHAFER 2,983,006

COLLAR CONNECTION

Filed June 14, 1957

3 Sheets-Sheet 2

INVENTOR.
JOHN V. SCHAFER
BY
Charles S. Penfold
ATTORNEY

May 9, 1961 J. V. SCHAFER 2,983,006

COLLAR CONNECTION

Filed June 14, 1957 3 Sheets-Sheet 3

INVENTOR.
JOHN V. SCHAFER
BY Charles S. Penfold
ATTORNEY

United States Patent Office 2,983,006

Patented May 9, 1961

2,983,006

COLLAR CONNECTION

John V. Schafer, 516 W. Chicago St., Bronson, Mich.

Filed June 14, 1957, Ser. No. 665,695

20 Claims. (Cl. 24—73)

This invention relates generally to an attachment or connector for wearing apparel and more particularly is directed to an attachment adapted for use with the collar of a shirt.

Practically every person has experienced the uncomfortable feeling and uneasiness that results from wearing a shirt of which the collar is relatively tight on the neck. Ofttimes the choking effect produced by a tight collar on a dress shirt is such that the shirt can no longer be used with satisfaction. It is, of course, recognized that a tight collar is ordinarily due to shrinkage and/or growth of an individual.

One of the principal objects of the subject invention is to provide an attachment or expander that can be readily applied to a tight collar to expand or increase its size and thereby prolong the useful life of the shirt.

More specifically, the invention contemplates the utilization of a device which is so designed and constructed that it offers just sufficient resilience to automatically compensate for variable dimensions in the neck bands of collars and shirts and maintain all portions thereof in proper conforming relationship with the neck of a wearer without imparting a binding effect.

Another object of the invention is to provide a device which is light in weight, economical to manufacture and when properly applied to a collar will be substantially concealed from view.

A significant object of the invention is to provide a device comprising a fastener or a button and an element forming a resiliently flexible loop. More particularly in this respect, the button is preferably made substantially rigid or inflexible and provided with an integral axially extending portion or offset provided with connection means preferably in the form of an opening or recesses therein and a swage or indent. The element is preferably constructed from a length of a helical spring of the stainless steel kind and its ends are secured in the opening or recesses so that the element will automatically form an oblong loop disposed in a plane substantially transverse to the longitudinal axis of the button. The size of the loop is determined by the length of the spring employed. A spring has proven very satisfactory in use because it forms a loop which is stable and readily manipulatable, and the fact that the element is offset from the button facilitates connection of the device with overlapping portions of a shirt collar or other garment.

The arrangement is preferably such that when the device is in use, the looped element will overlie the inner portion of a neck band and receive a button thereon and the button on the device is received in a buttonhole provided in the outer overlapping portion of the neck band. In other words, the looped element is disposed between the overlapping portions of the neck band.

A specific object of the invention is to provide a device of the kind described in which the button is provided with a recess within which an ornament is seated to improve the general appearance of the device.

Another object of the invention is to design and construct the connection means on the device so that the ends of the resiliently flexible element will be caused to interlock when secured to the connection means.

A further object of the invention is to provide a means securing the ends of the elements in place which serves to shape the axially extending portion of the device in a manner whereby to facilitate entry of the extending portion into a buttonhole.

A particular object of the invention is to provide a device in which the axially extending portion is provided with one or more holes communicating with the recesses or opening to facilitate cleaning of the latter during the plating operations.

A particularly significant object of the invention is to provide a device in which provision is made for limiting or controlling the expansion or extension of the resilient means or element of the connector in order to prevent damage to the resilient means by accidental overextension.

A specific object of the invention is to provide a construction in which the resilient means is preferably in the form of a tubular helical spring having an elongated limiter or controller secured therein at longitudinally spaced locations in such a manner that the length of the limiter between such locations is greater than the length of the spring between such locations, so that when the spring is extended, expanded or stretched the length or distance of the stretch will be substantially limited to the length of the limiter. In other words, the limiter is preferably made at least less stretchable than the resilient means within which it is secured and is preferably of a length somewhat greater than the length of the resilient means or portion thereof that is in a contracted or normal condition for expansion or extension.

Another object of the invention is to provide a unique method or arrangement of securing the limiter to the resilient means and a novel setup for securing the ends of the resilient means or element to a mounting or support, such as the button above referred to.

Other objects and advantages of the invention will become evident after the description hereinafter set forth is considered in conjunction with the drawing annexed hereto.

In the drawing, wherein like parts or elements are identified by the same numerals:

Figure 7:
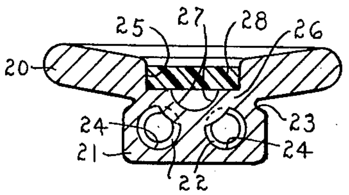
Figure 9:
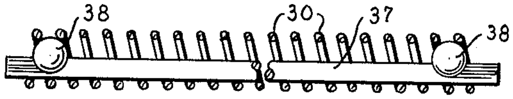
Figure 10:
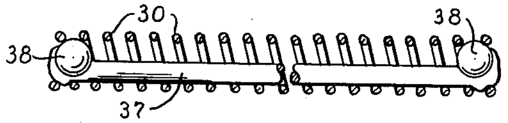
Figure 8:
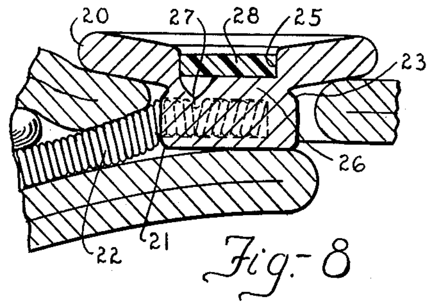
Figure 11:
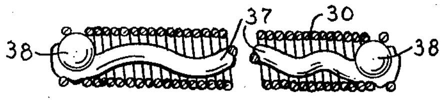
Figure 14:
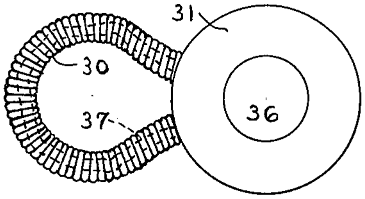
Figure 12:
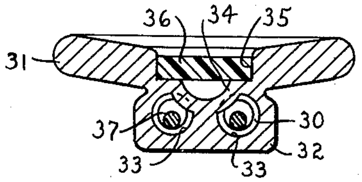
Figure 15:
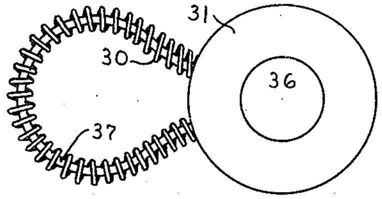
Figure 13:
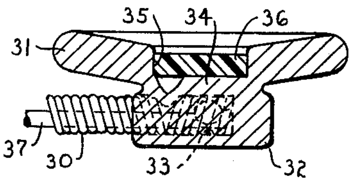
Figure 16:
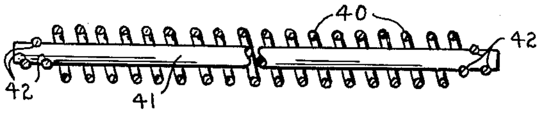
Figure 17:
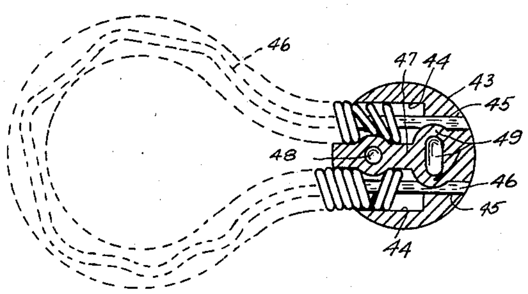
Figure 18:
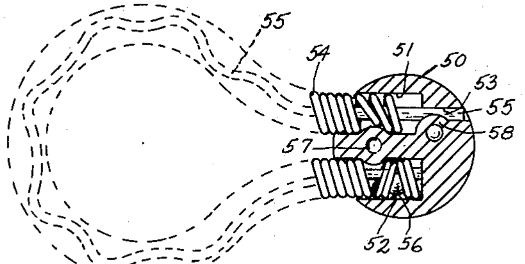

Figure 7 exemplifies a transverse section of a modified way of securing a resilient means or element to a mounting such as a button;

Figure 8 is a partial longitudinal section of the structure shown in Figure 7;

Figures 9 through 11 are longitudinal sectional views of a subassembly comprising resilient means and a limiter and exemplifies a preferred method of assembling the same;

Figures 12 and 13 are views respectively similar to Figures 7 and 8, showing the mode of securing or connecting the subassembly to the mounting or button;

Figures 14 and 15 are top or plan views of the device respectively depicting the resilient element of the subassembly in contracted and expanded conditions;

Figure 16 is a modified form of a subassembly for use with a button or other structure;

Figure 17 is a modified form of assembly showing the ends of a resiliently flexible element secured in a mounting at a predetermined location and the ends of a limiter secured in the mounting at a different location;

Figure 18 is a modified assembly showing the ends of a resiliently flexible element secured in a mounting at one location, with one end of a limiter secured at such location and its other end to the mounting at a different location.

Figure 23:
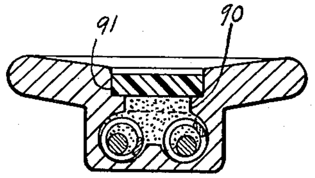
Figures 19, 20, 21:
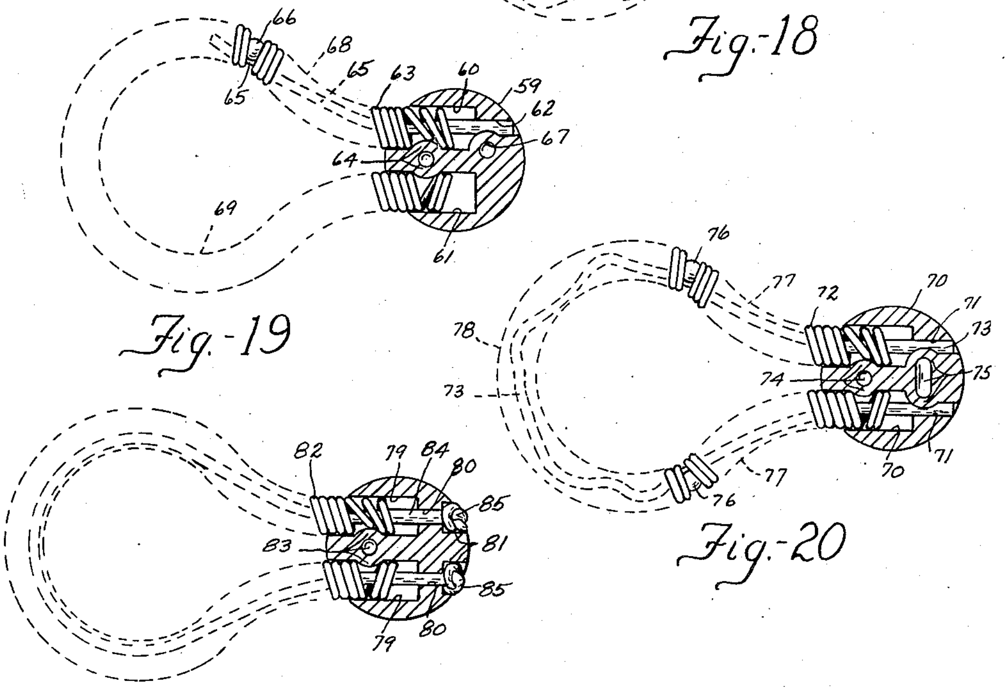
Figure 22:
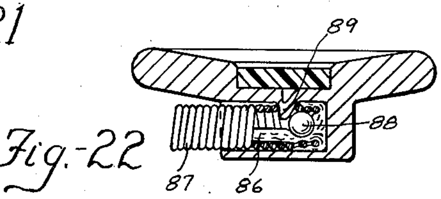

Figure 19 is a modified assembly showing the ends of an element secured in a mounting at one location, with one end of a limiter secured in the mounting at a different location and its other end in the element at a still different location;

Figure 20 is a modified assembly similar to the assembly depicted in Figure 17, with the limiter also being secured within the element at predetermined locations so that the outer curved extremity of the element may be flexed a greater extent than its inner extremity;

Figure 21 is a view of an assembly similar to Figure 17 showing a different way of securing the ends of the limiter to a mounting;

Figure 22 exemplifies an additional mode of securing the ends of a subassembly to a mounting; and Figure 23 is a modified assembly illustrating another way of securing the ends of an element and limiter to a mounting.

Figure 1:
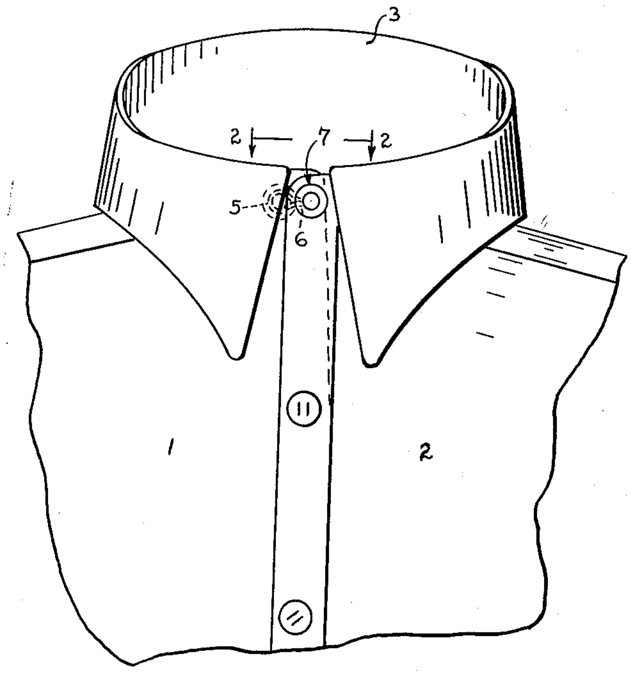
Figure 1 is a front view of a dress shirt showing the device embodying the invention applied thereto.
Figure 2:
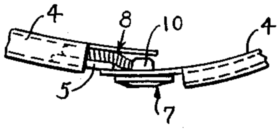
Figure 2 is a top view of the assembly illustrated in Figure 1 looking in the direction of the arrows 2—2.

Referring first to Figures 1 and 2 of the drawing, numerals 1 and 2 represent the front panel portions or sections of a conventional dress shirt and 3 is a collar having a neck band 4. The neck band 4 is provided with a conventional button 5 shown by the dotted lines in Fig. 1 as being permanently secured at one end thereof and a buttonhole 6 at its other end.

Referring further to the drawings, numeral 7 generally designates a fastener or mounting, preferably in the form of a button, and 8 designates a resiliently flexible element preferably in the form of a coiled or helical spring.

More particularly, the button 7 may be designed and constructed of any material desired, but as herein shown, preferably includes a metal body having an annular rim portion 9 forming a plane and a normally cylindrical offset or axially extending portion 10. The axially extending portion 10 may constitute an integral portion of the button body as shown or may be a separate part joined to the body. The axially extending portion 10 is preferably of a cross-dimension somewhat less than the diameter of the button and one side thereof is provided with connection means preferably in the form of a recess formed by a pair of corresponding generally cylindrical sockets, recesses, holes or seats 11 disposed in a parallel relationship and a swage or indent which will be referred to later. The recesses are closely related so that they preferably intersect as shown in Figures 5 and 6 for a purpose which will be described more in detail subsequently.

The resiliently flexible element 8 may be designed and constructed of any material desired, but as illustrated, is preferably made from a length of helical wire spring, tightly coiled, and of a suitable material and diameter for desirable flexation and manipulation. The element is preferably constructed of a material which is non-tarnishable such as stainless steel.

Figure 3:
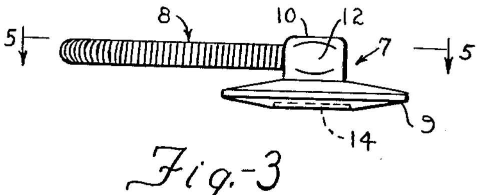
Figure 3 is a top view of the device.

The diameter of the element is preferably slightly less than the diameter of each of the recesses 11 so that the ends of the element are snugly received in the recesses and so that the element will automatically and naturally form an oblong loop disposed in a plane substantially parallel to the plane of the annular portion of the button. The diameter of the element is also preferably such that it will not cause a bulge in the collar when applied thereto. The ends of the element may be secured in the recesses in any desirable way but as shown in Figures 3 and 5, the axially extending portion 10 is compressed, swaged or indented to flatten the portion as indicated at 12 to cause an internal portion or portions of the extending portion to permanently grip and lock the ends in the recesses. Since the recesses 11 intersect, the end coils of the spring will engage so that when the ends are secured in place by swaging or indenting the offset the ends will be interlocked with one another, including the offset. The length of the spring utilized determines the size of the loop that is formed. Attention is directed to the fact that the offset or axial portion 10 after swaging is generally oblong in shape with the flat sides thereof disposed in parallel relation to the ends of the flexible element. As a result, the offset is made relatively narrow or of a width to facilitate introduction or piloting of the offset into the button hole 6.

Figure 6:
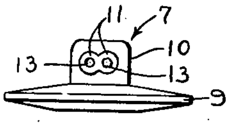
Figure 6 is a view of the button of the device showing the shape of the recess in the offset for receiving the resiliently flexible element.
Figure 5:
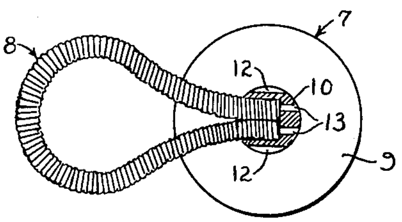
Figure 5 is a transverse section taken substantially on line 5—5 of Figure 3 showing one way of securing the element to the offset of the button.

As shown in Figures 5 and 6 the offset is provided with a pair of relatively small vent holes 13 constituting continuations of the recesses 11, the purpose of which is to permit the cleaning or removal of any plating solution deposits, after plating. This is important because if the recesses are not thoroughly clean the deposit will cause deterioration of the ends of the flexible element.

Figure 4:
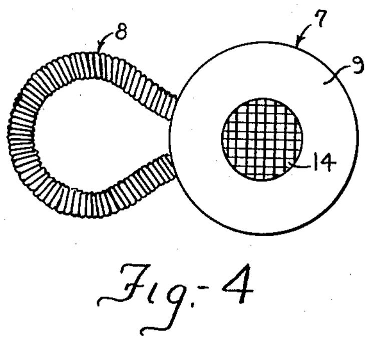
Figure 4 is a side view of the device.

As exemplified in Figures 1, 3 and 4, the front side of the annular portion 9 of the button of the device may be provided with a recess for receiving a jewel 14 or other ornamentation, such as an emblem to promote or enhance the general appearance of the device. It is, of course, obvious that the shape of the button may be varied and that the frontal surface of the button may be provided with any suitable indicia, as distinguished from a recess with a member such as 14 set therein.

To connect the device to a shirt collar, for example, the element 8 is fastened to the button 5 and the button 7 of the device is then inserted forwardly through the buttonhole 6 in that portion of the neck band on the front panel 2 of the shirt to locate the offset 10 therein as shown in Figure 2 with the element 8 extending between the end tabs of the neck band. The offset 10 is preferably of a size that will not increase the overall thickness of the neck band so as to prevent bulging of the collar. This device readily affords an expansion in the size of the collar and the size of the device is such that it can be easily manipulated and is substantially concealed from view.

It is to be distinctly understood that the button 7 can be made of any metal or plastic material suitable for the purpose and that if found desirable the button could be case or moulded onto the ends of the flexible loop. The element could also be made from a suitable plastic material.

Referring to the modified structure exemplified in Figures 7 and 8 of the drawing, there is shown a mounting preferably having an annular dished portion to constitute a fastener or button 20 having a cylindrical portion 21 or offset extending axially from the dished portion and supporting a resiliently flexible element or member 22 preferably constructed in the form of an elongated tubular helical spring like the spring 8 above referred to. The mounting is preferably provided with an exterior annular groove 23 adjacent the button and an offset or axial portion to facilitate proper positioning of the device in relation to the neck band of a shirt or other article of clothing where the device may be used. More specifically in this regard, the axial extent of the axial portion is substanitally equivalent to the thickness of a neck band so that when the device is applied to the overlapping ends thereof as depicted in Figure 8 the axial portion will take a position substantially within the confines of an elongated buttonhole so as not to increase the overall thickness of the overlapping ends of the band. The annular groove 23 affords a setup whereby in some instances the material defining one end of the buttonhole may be received therein to assist in holding the device thereto. It will be noted that the ends of the element are secured to the axial extension at a location relatively close to the base of the button so that inner portions of the element will extend into the buttonhole and thereby reduce the overall thickness of the overlapping ends of the neck band.

The axial portion 21 is preferably provided with a pair of corresponding transversely disposed parallel cylindrical sockets or recesses 24 which are spaced apart equal distances from the longitudinal axis of the mounting and are of a length sufficient to extend appreciable distances under a front circular recess 25 in a predetermined relationship to a wall 26 between the circular recess and the sockets 24 so that relatively long end portions or extremities of the resilient element or spring 22 can be inserted and secured in the sockets to afford a stable connection and maintain the spring in a generally U-shaped configuration for readily receiving a button or the equivalent.

The ends of the spring are preferably secured or locked in the sockets by indenting, pressing or deforming the wall 26 so that a portion or portions 27 thereof will be forced into a position between coils of the spring as clearly depicted. The diameter of the sockets are preferably slightly greater than the diameter of the spring so that the ends of the spring will be snugly or frictionally held in place due to the difference in cross-sectional dimensions as well as the tension produced by bending the spring to the shape shown.

If found desirable, a suitable ornamental member such as a jewel 28 may be secured in the recess to cover or conceal the indentation.

Referring now to the unique construction illustrated in Figures 9 through 15 of the drawing the device comprises a mounting and a helical spring 30 which substantially respectively correspond to the mounting and resilient means or spring as shown in Figures 7 and 8. More specifically, the mounting includes a button portion 31 and an offset or axial portion 32 provided with a pair of corresponding sockets 33. The mounting also includes a wall 34 and a round front recess 35 within which a jewel 36 is secured.

As alluded to above, one of the important objects of the invention is to provide means for controlling or limiting, within practicable limits, the expansion or extention of the spring and thereby prevent damage thereto resulting from over-extension or distortion. This factor is important because if the spring is expanded excessively the coils of the spring will take a set to prevent return to their normal contracted condition, in which event the loop may be too large for holding purposes.

Various means may be utilized for this purpose but as disclosed herein the prevention of over-extension is preferably accomplished by securing means such as a limiter or control 37 within the confines of the spring. The limiter may be designed and constructed as desired, but is preferably made from a length of material, such as a nylon stranded cord which is less stretchable than that of the spring. In other words, the spring and limiter comprise a subassembly in which a pair of members or elements of different degrees of stretchability are secured one within the other to limit extension of the outer member. The nylon stranded cord affords a minimum degree of stretchability but if desired the limiter may be made so that it is non-extensible.

The spring and limiter are preferably assembled by a method which comprises inserting the limiter in the spring, stretching the spring by axial or lateral forces to a predetermined or desired length, forcing elements, such as steel balls 38 or equivalent means into the extremities of the spring to expand end coils thereof radially so that the limiter is compressed and/or clamped or pressed between certain end coils, allowing the spring to contract, severing the limiter to leave end portions of a predetermined length protruding from the ends of the spring, heating the end portions to cause the material to flow between the expanded or adjacent end coils and/or about the balls, and then allowing the material to cool and set to permanently secure the limiter substantially within the confines of the spring.

More particularly, the method includes placing the spring in a fixture having fittings which engage the ends of the spring and are relatively movable to stretch the spring to a predetermined length. The limiter is preferably somewhat longer than the length of the expanded or stretched spring and is preferably inserted into the spring before the spring is expanded but may be inserted afterward. After the spring is stretched by the fittings, the balls are pressed into the ends of the spring to more or less expand the spring so that the balls will be held between the spring coils or opposed surfaces thereof and compress the limiter and/or force portions thereof between the coils and thereby fasten the ends of the limiter in the spring at longitudinally spaced locations. When the limiter has been thus secured, the spring is allowed to contract to slacken and afford a surplus of the limiter in the spring as shown in Figure 11, after which the ends of the limiter are severed, preferably at predetermined spaced locations from the ends of the expanded spring to leave end portions extending therefrom as shown in Figure 9. The exposed ends of the limiter are then heated so the material will flow into and between the coils and/or about the balls and more or less form knobs or formations substantially closing off the ends of the spring. The material is then allowed to cool and thereby bond or cement the spring, limiter and balls to lock them together and reenforce the extremities of the spring as depicted in Figure 10. Thus, the length of the limiter is substanitally equivalent to the length of the expanded spring or greater than the length of the spring in a contracted or normal state. After the spring and limiter are thus secured to provide a subassembly, the ends thereof are inserted into the sockets 33 and the wall 34 indented so that a portion or portions thereof will be wedged between certain coils and otherwise clamp the wedged and adjacent coils in the recesses as shown in Figures 12 and 13. With this unique setup, the spring cannot, for example, be expanded or extended to an extent greater than that permitted by the length of the limiter as illustrated in Figure 15.

It is to be understood that the subassembly comprising the spring and limiter can be connected together without utilizing the step of heating the extended ends of the limiter as described above. For example, after the spring and limiter are connected by the balls and the spring is in a contracted condition, a plastic cement such as polystyrene may be applied to the ends of the limiter and ends of the spring to bond and reenforce the connections between the spring, limiter and balls. The cement also causes the strands of the limiter to spread apart and while the cement is still in a plastic state the ends of the subassembly are pressed home into the recess in the mounting or button so that the cement will assist in securing the subassembly to the mounting preparatory to swaging or distorting a portion or portions of the mounting into connection with coils of the spring.

The modified subassembly shown in Figure 16 of the drawing comprises a helical spring 40 and a limiter 41. In lieu of utilizing balls and heating the limiter as above described, the ends of the spring are clamped or pressed onto the limiter at one or a plurality of locations as indicated at 42 when the spring is expanded to a predetermined length, after which the spring is allowed to return to its normal collapsed condition so that a length of the limiter, greater than the normal length of the spring, is confined in the spring for limiting or controlling the expansion or extension of the spring.

As noted above, a mounting, spring and limiter can be secured or assembled together in other ways. For example, in the modified construction exemplified in Figure 17, a centrally disposed axial extension 43 of a mounting, such as a button, is provided with a pair of corresponding substantially radial recesses or holes 44 at one side of the extension and radial recesses or holes 45 at the opposite side of the extension. The recesses 44 and 45 are axially aligned and the recesses 44, which are somewhat larger in cross-dimension, frictionally receive the ends of a resiliently flexible element such as a spring. A limiter 46 is arranged in the element and has ends extending beyond the ends of the spring and into the smaller recesses 45. The button is deformed so that wall thereof, similar to the wall 26 in Figure 8, may be swaged or distorted including a partition 47, as indicated at 48 and 49, to respectively anchor the ends of the spring and limiter in the recesses 44 and 45 at longitudinally spaced locations. It will be noted that an excess or surplus of the limiter is confined in the spring as shown by the dotted lines in order to permit the spring to stretch or expand an extent substantially corresponding to the length or distance of the limiter between its points of attachment to the mounting.

In the modification depicted in Figure 18 of the drawing, an axial extension 50 of a mounting is provided with a pair of corresponding substantially radial recesses, holes or openings 51 and 52 and a recess or hole 53 extending axially from the opening 51, with the ends of a spring 54 disposed in the openings 51 and 52. A limiter 55 is carried by the spring with an excess therein and one end of the limiter is secured in one end of the spring by a ball 56 or equivalent means and its other end projects beyond the other end of the spring and into the hole 53. The mounting is preferably swaged or distorted to cause a portion or portions of a wall and/or a partition to anchor the ends of the spring in the openings 51 and 52 as indicated at 57 and the projecting end of the limiter in the hole 53 by an offset formation 58. In this setup one end of the limiter is anchored in one end of the spring and in the opening 52 and the other end of the limiter is anchored to the mounting independently of the spring and at a location spaced generally longitudinally from the other point or points of anchorage.

In the modification illustrated in Figure 19, an axial extension 59 of a mounting is provided with a pair of corresponding substantially radial recesses or openings 60 and 61 and a recess or hole 62 which respectively correspond to the recesses 51 and 52 and hole 53, above referred to, and spring 63 has its ends anchored in the recesses 60 and 61 by a formation or formations as indicated at 64. A relatively short limiter 65 has one end secured in the spring by a ball 66 or by some other suitable means and its other end projects beyond one end of the spring into the hole 62 where it is anchored by an offset formation as indicated at 67 at a location generally spaced longitudinally from the anchorage 64 so that a portion 68 of the spring between the latter anchorage and the connection between the end of the limiter secured by the ball is substantially prevented from stretching longitudinally whereas the remaining portion 69 of the spring may be stretched without use of a limiter.

The modified assembly depicted in Figure 20 of the drawing comprises a mounting having an axial extension provided with a pair of corresponding recesses, openings or holes 70 and openings or holes 71. The ends of a spring 72 are anchored in the recesses 70 and the projecting ends of a limiter 73 are anchored in the holes 71 at longitudinally spaced locations as indicated at 74 and 75 in a manner substantially corresponding to that employed in the structure shown in Figure 17. The limiter is also secured in the spring at locations preferably equally spaced from the anchorages 74 by balls 76 or other suitable means so that portions 77 of the spring are held against substantial longitudinal stretch, whereas the remaining portion 78 between the balls may be stretched or expanded within practicable limits to the extent permitted by the surplus of the limiter between the balls as shown by the dotted lines.

In the modified device exemplified in Figure 21 of the drawing, an axial extension of a mounting is provided with recesses, openings or holes 79 and openings or holes 80 which are counter-recessed at 81. A spring 82 has its ends anchored in the recesses 79 by portions 83 of the mounting and the ends of a limiter 84 extend beyond the ends of the spring into the holes 80 and are provided with knots or abutments 85 disposed in the counter-recesses 81 for securing the ends of the limiter to the body at locations spaced axially from the portions 83. It will be noted that the lengths of the spring and limiter and their anchorings or points of securement to the mounting are preferably such that the spring is substantially held against expansion or stretch whereas in the structures in Figures 9 through 20, the stretch or expansion of the spring is predetermined.

In the modification exemplified in Figure 22 of the drawing, an axial extension of a mounting is provided with a pair of corresponding recesses and the projecting ends of a limiter 86 are folded back in overlapping relation with the ends of spring 87 so that the overlapping stranded portions of the limiter are disposed or crowded in between the ends of the springs and the walls of the recesses. Any means suitable for the purpose may be utilized to secure or attach the ends of the spring and limiter together and in the recesses but as shown, balls 88 are first pressed into the spring to secure the limiter in a relaxed condition in the spring to provide a subassembly comprising the spring and limiter, after which the ends of the assembly are disposed in the recesses as shown for securement therein by means such as indents or swages 89. The ends of the limiter are thus firmly secured to the spring as well as to the mounting.

Also, it will be apparent that a subassembly and mounting can be secured together by utilizing a suitable cement for bonding purposes, in which event, the swaging or distorting operation may be eliminated. For example as exemplified in Figure 23 of the drawing, a mounting is provided with a pair of recesses for receiving the ends of the subassembly and an axial passage 90 which is counter-recessed at 91. With this setup, a suitable cement can be forced through the passage between the ends of the spring and about the coils and so that a sufficient quantity thereof is left in the passage to permanently join the subassembly and mounting, after which a jewel can be secured in the counter-recess.

In view of the foregoing it will be manifest that the various recesses, openings or holes provided in the mountings constitute socket means for receiving the spring and the limiter.

Having thus described my invention, it is obvious that various modifications may be made in the same without departing from the spirit of the invention, and, therefore, I do not wish to be understood as limiting myself to the exact forms, constructions, arrangements and combinations of parts herein shown and described.

I claim:

1. In combination: a button having an axial extension provided with socket means, an elongated tubular stretchable member having ends secured in the socket means to form a loop for receiving a fastener, an elongated element of a length greater than the normal length of the member disposed in the member and having ends extending into said socket means, and means securing said ends of said element in said socket means so that said element will limit the stretch of said member.

2. A device for detachably connecting overlapping frontal portions of a shirt collar of the type in which one portion is provided with a button and the other portion with a button hole, said device being adapted for placement in a substantially horizontal position between the collar portions and comprising a button having a short axial extension for disposition in the button hole and being provided with receiving means extending transverse to the longitudinal axis of the extension, a coiled spring having free end portions arranged in a side-by-side relationship within the confines of the receiving means to form a relatively short oblong loop for detachably receiving the button, and means formed integrally with the button and extending axially thereof into voids of the spring for permanently securing the ends of the spring in said receiving means so that the loop will be maintained in a relatively stable plane transverse to the longitudinal axis of the extension.

3. The device defined in claim 2, including an elongate element arranged in the spring and having ends extending into the ends of the spring, and plugs disposed in the ends of the spring and permanently locked in clamping relationship with the ends of the element by said integrally formed means so that the element will limit the expansion of the spring.

4. A device for detachably connecting overlapping frontal portions of a garment in which one portion is provided with a fastener and the other portion with a button hole, said device being adapted for placement in a substantially horizontal position between the portions and comprising a button having a rim and a short axial extension for disposition in the button hole provided with socket means extending transverse to the longitudinal axis of the extension, a generally tubular stretchable member having free end portions arranged in a side-by-side relationship within the confines of the socket means to form a relatively short substantially oblong loop for detachably receiving the fastener so that said other portion of the garment will be disposed between said rim and said member, means permanently securing the end portions of the member in firm fixed positions in the socket means so that the loop will be maintained in a relatively stable plane transverse to the longitudinal axis of the extension, and an elongate element arranged in the spring and having ends extending into the socket means and secured to the fastener for limiting expansion of the member.

5. A device for detachably connecting overlapping frontal portions of a garment of the type in which one portion is provided with a fastener and the other portion with a button hole, said device being adapted for placement in a substantially horizontal position between said portions and comprising a button having a rim and a centrally disposed short axial extension for readily detachable disposition in the button hole, said extension being solid in cross-section and provided with radial socket means intersecting its periphery, an elongated coiled spring having free end portions arranged in a side-by-side relationship in said socket means to form a relatively short oblong loop for readily detachably receiving the fastener, and means permanently securing the ends of the spring in said socket means so that the loop will be maintained in a relatively stable plane in spaced parallel relation to the plane of the rim whereby the loop and rim will receive therebetween the said other portion of the garment when the device is attached thereto.

6. In combination: a button having an axial extension provided with receiving means, an elongate tubular stretchable member having ends disposed in the receiving means to form a loop for receiving a fastener, an elongate element of a length greater than the normal length of the member disposed in the member and having ends extending into the receiving means, and means securing the ends of said member and the ends of said element in said receiving means so that said element will limit the stretch of said member.

7. The combination defined in claim 6, including means disposed in the stretchable member and engaging the element to assist in holding the element in said member.

8. The combination defined in claim 6, in which the stretchable member is in the form of a helical spring and the securing means comprises means integral with the button which extends into the voids of the spring and also clamps the element.

9. The combination defined in claim 6, in which the ends of the element extend beyond the ends of the member, and the securing means includes means for securing the ends of the member at one location in the receiving means and means for securing the ends of the element at another location in said receiving means.

10. The combination defined in claim 6, in which means is disposed in the member against the element and one end of the element extends beyond one end of the member, and the securing means includes a first integral portion of the button which clamps against the ends of the member and a second integral portion which clamps against the said one end of the element.

11. The combination defined in claim 6, in which a plurality of means are disposed in the member and clamp against the element at locations remote from said receiving means.

12. The combination defined in claim 6, in which the axial extension of the button is provided with abutment means, and the securing means, comprises means integral with the button clamping against the ends of the member and ends of the element which extend beyond the ends of the member are enlarged to engage said abutment means.

13. The combination defined in claim 6, in which the ends of the element overlap the ends of the member and the securing means clamps against the ends of the member and said overlapping ends of the element.

14. The combination defined in claim 6, in which means are disposed in the ends of the member and clamp against the element and the ends of the element overlap the ends of the member and the securing means clamps against the ends of the member and said overlapping ends of the element.

15. A device for detachably connecting overlapping frontal portions of a conventional shirt collar of the type in which one portion is provided with a button and the other portion with a button hole, said device being adapted for placement in a substantially horizontal position between the collar portions and comprising a button having a body portion provided with a rim and a relatively short centrally arranged axial extension, said axial extension being adapted for disposition in the button hole of the collar and being provided with socket means extending transverse to the longitudinal axis of the extension, a relatively stiff coiled spring having free end portions snugly arranged in a relatively close side-by-side relationship and terminating within the confines of the socket means to form a relatively short substantially oblong loop for detachably receiving the button on the collar, and means permanently securing the end portions of the spring in firm fixed positions in the socket means so that the loop will be maintained in a relatively stable plane disposed transverse to the longitudinal axis of the extension and in substantially spaced apart parallel relationship to a plane formed by the rim of said button.

16. The device defined in claim 15, in which the button is provided with relatively thick wall structure which is indented into voids of the spring for permanently securing its end portions in the socket means.

17. A device of the kind described comprising a one-piece fastener for reception in a buttonhole provided in a layer of fabric, said fastener having a body provided with a centrally disposed axially extending substantially cylindrical portion and a rim portion substantially forming a plane, said axially extending portion being solid and provided with a substantially radial socket intersecting its periphery, and a relatively stiff spring-like element having free ends terminating and securely concealed in said socket and forming a short loop normally fixed in a plane substantially parallel to the plane of the rim for detachably receiving a fastener, the space between said planes being such that when the fastener is received in the buttonhole the fabric will be arranged between said rim and said loop.

18. In combination: a single mounting provided with receiving means, an elongate coiled stretchable member having ends secured in said receiving means to form a relatively short stable loop for receiving a fastener, an elongate element disposed in said stretchable member and having a length greater than the length of said member, and a pair of means gripped adjacent convolutions by said member for pinching the element at spaced locations between said convolutions and said means so that said element will limit the stretch of said member.

19. A solid one-piece button of a size for insertion into a conventional buttonhole, said button having a large body portion and a relatively small axially extending end portion provided with radial receiving means, an elongate coiled helical spring having free ends extending into the receiving means to form a relatively stable loop disposed in a plane transverse to the longitudinal axis of the button, and said button having a distorted portion extending into said receiving means and voids between adjacent convolutions of the spring for locking its ends in said receiving means.

20. A one-piece mounting having a large portion and a small axial extension provided with substantially radially extending socket means, a tubular helical spring having ends secured in the socket means, an elongate limiter arranged in the spring, and means disposed in the spring for securing the end portions of the limiter in and against the spring.

References Cited in the file of this patent

UNITED STATES PATENTS

| | | |
|---|---|---|
| 179,280 | De Wolf | June 27, 1876 |
| 257,738 | Moore | May 9, 1882 |
| 450,510 | Heuser | Apr. 14, 1891 |
| 483,672 | Green | Oct. 4, 1892 |
| 609,495 | Brooks | Aug. 23, 1898 |
| 617,074 | Blumenthal | Jan. 3, 1899 |
| 666,860 | Buzzacott | Jan. 29, 1901 |
| 981,274 | Jacobs | Jan. 10, 1911 |
| 1,031,399 | Tirrill | July 2, 1912 |
| 1,057,159 | Madsen | Mar. 25, 1913 |
| 1,285,657 | Finucan | Nov. 26, 1918 |
| 1,296,057 | Ellsworth | Mar. 4, 1919 |
| 1,463,213 | Hueseman | July 31, 1923 |
| 1,543,785 | Modrell | June 30, 1925 |
| 1,610,829 | Walch | Dec. 14, 1926 |
| 1,751,415 | McCaffrey | Mar. 18, 1930 |
| 2,096,897 | Herrmann | Oct. 26, 1937 |
| 2,188,534 | Durney | Jan. 30, 1940 |
| 2,544,876 | Bowder | Mar. 13, 1951 |
| 2,735,168 | Leonhardt et al. | Feb. 21, 1956 |
| 2,776,471 | Doebell | Jan. 8, 1957 |

FOREIGN PATENTS

| | | |
|---|---|---|
| 438,355 | Great Britain | Nov. 15, 1935 |
| 730,886 | France | May 23, 1932 |
| 767,063 | Germany | Aug. 16, 1951 |